US008195885B2

(12) United States Patent
Mori et al.

(10) Patent No.: US 8,195,885 B2
(45) Date of Patent: Jun. 5, 2012

(54) ELECTRONIC UNIT FOR SAVING STATE OF TASK TO BE RUN IN STACK

(75) Inventors: Takahiko Mori, Kariya (JP); Daisuke Tokumochi, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1350 days.

(21) Appl. No.: 11/819,158

(22) Filed: Jun. 25, 2007

(65) Prior Publication Data
US 2008/0127201 A1 May 29, 2008

(30) Foreign Application Priority Data

Jun. 23, 2006 (JP) ................................. 2006-173885

(51) Int. Cl.
*G06F 13/00* (2006.01)
*G06F 9/30* (2006.01)
*G06F 7/38* (2006.01)
(52) U.S. Cl. ..................... 711/132; 712/202; 712/228
(58) Field of Classification Search .................... None
See application file for complete search history.

(56) References Cited

U.S. PATENT DOCUMENTS

| 6,240,358 | B1 | 5/2001 | Kawai | |
|---|---|---|---|---|
| 6,411,984 | B1 * | 6/2002 | Leach et al. | 709/200 |
| 6,560,674 | B1 * | 5/2003 | Hosogi et al. | 711/118 |
| 6,578,094 | B1 * | 6/2003 | Moudgill | 710/57 |
| 7,225,443 | B2 * | 5/2007 | Lake | 718/100 |
| 7,313,797 | B2 * | 12/2007 | Sundaram et al. | 718/108 |
| 7,725,620 | B2 * | 5/2010 | Bartley et al. | 710/22 |
| 7,823,131 | B2 * | 10/2010 | Gard et al. | 717/125 |
| 8,037,475 | B1 * | 10/2011 | Jackson | 718/104 |
| 2002/0065985 | A1 * | 5/2002 | Garnett et al. | 711/117 |
| 2004/0139282 | A1 * | 7/2004 | Yoshioka et al. | 711/133 |
| 2006/0123191 | A1 * | 6/2006 | Hayasaka | 711/113 |
| 2006/0212869 | A1 * | 9/2006 | Bril et al. | 718/102 |
| 2007/0022423 | A1 * | 1/2007 | Bril et al. | 718/102 |

FOREIGN PATENT DOCUMENTS

| JP | H03-278135 | 12/1991 |
|---|---|---|
| JP | H07-152578 | 6/1995 |
| JP | H09-091154 | 4/1997 |
| JP | H09-198258 | 7/1997 |
| JP | 2000-029721 | 1/2000 |
| JP | 2000-047883 | 2/2000 |
| JP | 2000-132409 | 5/2000 |
| JP | 2000-187601 | 7/2000 |

* cited by examiner

*Primary Examiner* — Emerson Puente
*Assistant Examiner* — Adam Lee
(74) *Attorney, Agent, or Firm* — Nixon & Vanderhye PC

(57) ABSTRACT

In an electronic unit having a stack in memory and adapted to run a plurality of tasks in accordance with a multitask operating system and to save context data in the stack, a scheduling unit schedules the plurality of tasks for wakeup so as to execute the plurality of tasks. Each of the plurality of tasks stays in at least one of a suspended state, a ready state, and a running state. A measurement unit measures an amount of space to be used in the stack during the at least one of the tasks staying in neither the running state nor the ready state.

6 Claims, 6 Drawing Sheets

ELECTRONIC UNIT FOR SAVING STATE OF TASK TO BE RUN IN STACK

CROSS REFERENCE TO RELATED APPLICATIONS

This application is based on Japanese Patent Application 2006-173885 filed on Jun. 23, 2006. This application claims the benefit of priority from the Japanese Patent Application, so that the descriptions of which are all incorporated herein by reference.

TECHNICAL FIELD

The present invention relates to electronic units for saving, in a stack (stack space), context data (context identifier) identifying the state (context) of a task to be run by a processor. The present invention also relates to program products embedded in a media accessible by a processor operative to save, in a stack, context data identifying a state of a task to be run by the processor.

BACKGROUND

Conventional electronic control units (ECUs) to be installed in, for example, vehicles are configured to manage a plurality of tasks and execute the tasks in a time-sharing mode in accordance with an embedded operating system (OS). As such embedded operating systems, a Real-Time Operating system (RTOS) is normally used. The RTOS is operative to schedule for wakeup and running of a plurality of tasks in accordance with respectively corresponding determined priorities. As such real-time operating systems, an OSEK/VDX OS has been well known.

Upon a plurality of tasks being scheduled for execution by a microprocessor, when an interrupt fires to switch from one to another task, the microprocessor is operative to save context data identifying the state of each register being used by execution of a task in a stack previously prepared in a RAM (Random Access Memory). In addition, when a function is called, a microprocessor is operative to save context data indicative of the state of each register in a stack (stack space) previously prepared in a RAM.

As set forth above, stacks play an important role as memory area for storing a result of processes executed by a microprocessor. For this reason, in order to develop an electronic system for controlling targets, such as in-vehicle devices, it is especially important to allocate a required memory space to a stack, and to design a plurality of software modules so as to prevent stack overflow.

In conventional electronic system developments, therefore, an amount of space in a stack to be used for each module of software is estimated, and the total amount of space in the stack to be used for all of the software modules is calculated by desk calculation. This can estimate the size of a stack required for all of the software modules to be executed by a microcomputer.

However, even one nest and the number of arguments to be used in one or more functions of each of the software modules can dynamically change an amount of space in a stack to be required for a corresponding one of the software modules. Moreover, the frequency of occurrence of interrupts also can dynamically change an amount of space in a stack to be used for a corresponding one of the software modules.

As described above, in ECUs designed to schedule a plurality of tasks for execution in a multitask OS, it may be difficult to properly estimate, using desk calculation, the size of a stack required for each of the software modules to be executed by a microcomputer.

For this reason, in order to properly check the size of a space in a stack required for each of program tasks to be executed by a microcomputer, a conventional electronic system, which is disclosed in Japanese Unexamined Patent Publication No. H03-278135, has installed therein functions of:

estimating an amount of space in a stack to be actually used by a next task each time of the occurrence of switching from a current task to the next task to determine whether the estimated amount of space in the stack exceeds the previous maximum amount of space therein; and updating the previous maximum amount of space in the stack to the estimated amount of space in the stack to be used by the next task when it is determined that the estimated amount of space in the stack exceeds the previous maximum amount of space therein.

In addition, a conventional computer system, which is disclosed in Japanese Unexamined Patent Publication No. 2000-187601, is configured to:

monitor the movement of a stack pointer pointing to the most recently referenced location on a stack to another location thereon upon switching of a task or execution of a load module; and estimate an amount of space in the stack to be required for a task to be switched or the load module based on the monitored movement of the stack pointer.

In the latter patent Publication, the computer system is designed to, whenever the stack pointer moves, estimate an amount of space in the stack to be required for a task to be switched or a load module based on the monitored movement of the stack pointer. This may cause the overhead of the estimating process to increase, in other words, cause the resources of the computer system to be excessively utilized for the estimating process. The increasing of the overhead may cause an unwanted decrease in the operation rate of the computer system for execution of tasks previously scheduled therefor each time of the movement of the stack pointer.

In addition, in the former and latter patent Publications, if real-time control that requires severe execution-timing restrictions is needed to be executed in vehicle control, for example, it may be difficult to estimate an amount of space in a stack to be used by a next task to be switched each time of the occurrence of switching from a current task to the next task.

BRIEF SUMMARY

In view of the background, one aspect of the present invention obtains an amount of stack space to be used for a task while having little influence on running of the tasks.

According to one aspect of the present invention, there is provided an electronic unit having a stack in memory and adapted to run a plurality of tasks in accordance with a multitask operating system and to save context data in the stack. The context data is indicative of a state of at least one task being run by the electronic unit. The electronic unit includes a scheduling unit configured to schedule the plurality of tasks for wakeup so as to execute the plurality of tasks. Each of the plurality of tasks stays in at least one of a suspended state, a ready state, and a running state. The electronic unit includes a measurement unit configured to measure an amount of space to be used in the stack during the at least one of the tasks staying in neither the running state nor the ready state (i.e., while in a suspended state).

According to another aspect of the present invention, there is provided an electronic unit having a stack in memory and adapted to run a plurality of tasks in accordance with a multitask operating system and to save context data in the stack. The plurality of tasks each have a priority. The plurality of tasks include a check task whose priority is lower than the remaining tasks. The context data is indicative of a state of at least one task being run by the electronic unit. The electronic unit includes a scheduling unit configured to establish a schedule of the plurality of tasks for wakeup based on the priorities of the plurality of tasks, and an executing unit configured to execute the plurality of tasks in accordance with the established schedule in descending order of priority.

According to a further aspect of the present invention, there is provided a program product embedded in a media accessible by a computer accessible to a stack in memory. The computer is adapted to run a plurality of tasks in accordance with a multitask operating system and to save context data in the stack. The context data is indicative of a state of at least one task being run by the computer. The program product includes means for instructing a computer to schedule the plurality of tasks for wakeup so as to execute the plurality of tasks. Each of the plurality of tasks stays in at least one of a suspended state, a ready state, and a running state. The program product includes means for instructing a computer to measure an amount of space to be used in the stack during the at least one of the tasks staying in neither the running state nor the ready state (i.e., while in the suspended state).

According to a still further aspect of the present invention, there is provided a program product embedded in a media accessible by a computer accessible to a stack in memory. The plurality of tasks each have a priority. The plurality of tasks include a check task whose priority is lower than the remaining tasks. The context data is indicative of a state of at least one task being run by the computer. The program product includes means for instructing a computer to establish a schedule of the plurality of tasks for wakeup based on the priorities of the plurality of tasks, and means for causing a computer to execute the plurality of tasks in accordance with the established schedule in descending order of priority.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
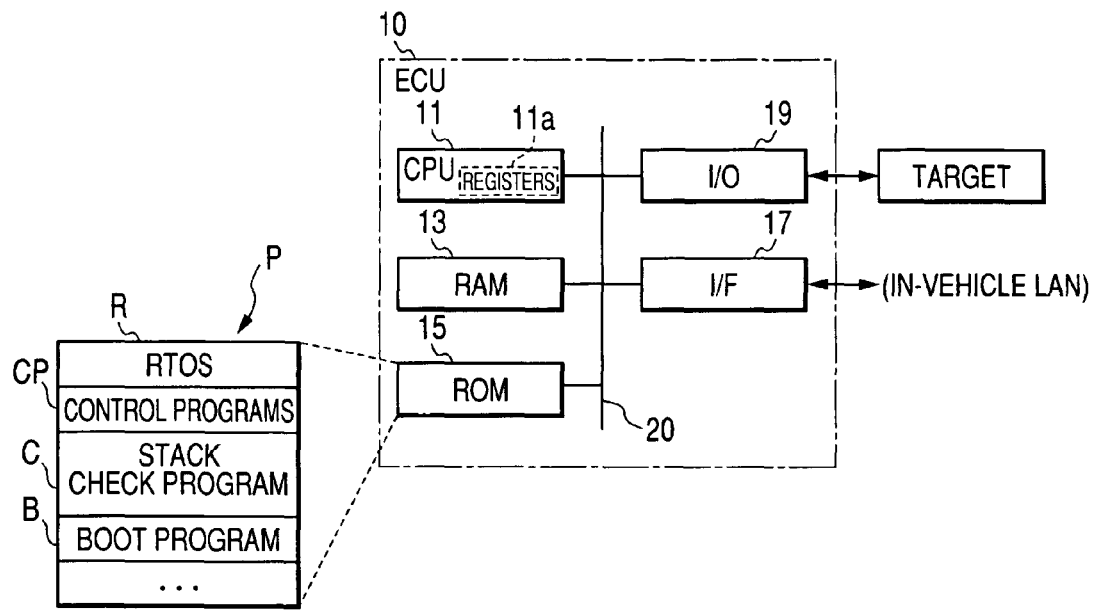
FIG. 1 is a block diagram schematically illustrating an example of the configuration of an electronic control unit according to an embodiment of the present invention.

An embodiment of the present invention will be described hereinafter with reference to the accompanying drawings. In the drawings, identical reference characters are utilized to identify identical corresponding components.

Figure 2:
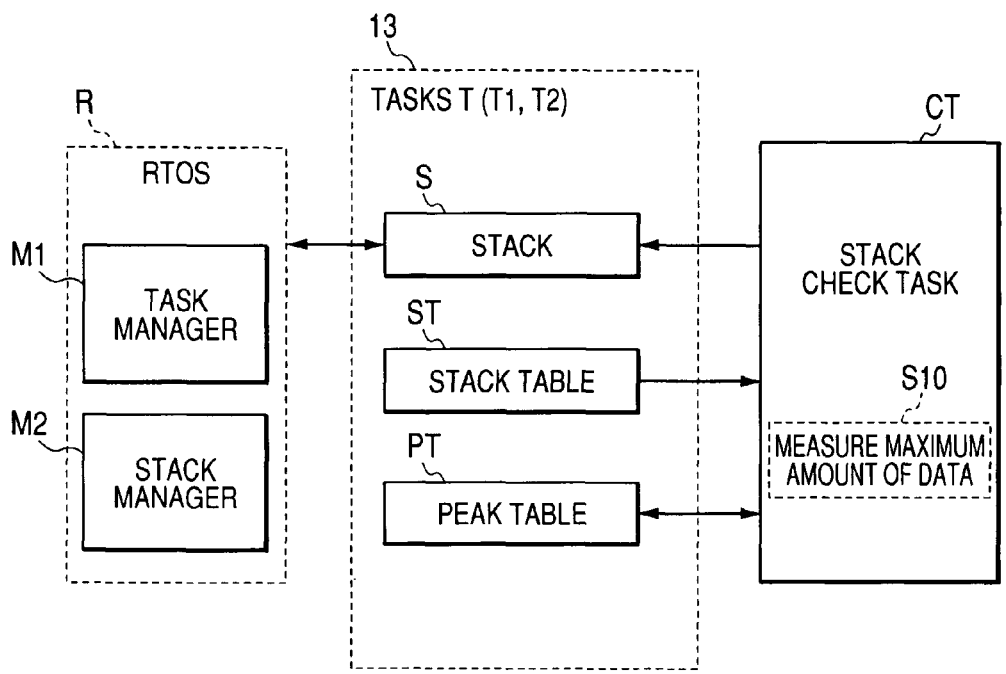
FIG. 2 is a block diagram schematically illustrating an example of the structures of an RTOS and a RAM illustrated in FIG. 1 and that of operative connections between the RTOS and the RAM and between the RAM and a stack check task according to the embodiment.

Referring to FIGS. 1 and 2, an electronic control unit (ECU) 10 according to the embodiment is used to be installed beforehand in a vehicle. The ECU 10 is operative to control one or more target in-vehicle devices, such as igniters and injectors for the respective cylinders of an engine.

The ECU 10 is composed of a CPU 11 as an example of microprocessors, a random access memory (RAM) 13, a nonvolatile memory (read only memory) ROM 15, a communication interface (I/F) 17, an input/output interface (I/O interface) 19, and a bus 20. The CPU 11, the RAM 13, the ROM 15, the communication I/F 17, and the I/O interface 19 can communicate with each other via the bus 20. As the ROM 15, nonvolatile recordable and erasable memories can be used.

The CPU 11 is operative to execute various jobs (processes) for control of the in-vehicle devices.

The RAM 13 serves as a working area to be used by the CPU 11 upon the CPU 11 executing the various processes.

The ROM 15 has stored therein various programs P; these various programs cause the CPU 11 to execute the various tasks.

The communication interface 17 is communicably coupled to an in-vehicle LAN (Local Area Network) installed in the vehicle and operative to allow data communications between the CPU 11 and external devices, such as other ECUs communicably coupled to the in-vehicle LAN.

The I/O interface 19 is electrically connected to various sensors associated with the various operating conditions of the target in-vehicle devices. The I/O interface 19 is also electrically connected to the target in-vehicle.

Each of the various sensors is configured to measure a corresponding operating condition of a corresponding one of the target in-vehicle devices to thereby output, to the I/O interface 19, a measurement signal indicative of the measured operating condition.

The target in-vehicle devices include actuators, such as the igniters and the injectors, operative to work for control over variables in and around the vehicle.

The I/O interface 19 is configured to receive the measurement signals output from the various sensors, convert the received measurement signals into digital measurement data, and pass them to the CPU 11.

The I/O interface 19 is configured to output, to the target in-vehicle devices, control signals for activation, control, and stop of them based on instructions sent from the CPU 11.

As illustrated in FIG. 1, the various programs P installed in the ROM 15 include a Real Time Operating System (RTOS)

R as an example of operating systems, and a plurality of control programs CP designed to control the in-vehicle devices.

For example, information required to execute the plurality of control programs CP, such as destination addresses allocated for the programs CP, is loaded from the ROM 15 to the RAM 13.

This allows a plurality of normal tasks T corresponding to the plurality of control programs CP to be generated in the RAM 13 when the programs CP are run.

The RTOS R works to cause the CPU 11 to schedule the plurality of normal tasks T for wakeup so as to run them in accordance with a time-sharing schedule, that is, in pseudo parallel mode.

In the embodiment, the ECU 10 works to manage the plurality of tasks T and/or a stack S to be allocated in, for example, the RAM 13. As the RTOS R, an OSEK/VDX operating system can be used.

The stack S is configured to start at a given memory location (address) and grow (expand) towards, for example, lower addresses. Specifically, the stack S is configured to stack pieces of data from a predetermined bottom location corresponding to a predetermined end address thereof upward.

The stack S can be configured to grow (expand) towards upper addresses.

A priority has been set to each of the plurality of tasks T.

The RTOS R includes a task manager M1 that causes the CPU 11 to serve as a task manager, thus scheduling the tasks T for execution in descending order of priority.

In more detail, the task manager M1 causes the CPU 11 to switch a task in a ready state with the highest priority in the tasks T into a running state, and causes the CPU 11 to run the highest-priority task in the running state. Note that, in the embodiment, the specifications of the RTOS R allow one task with a priority to be run in priority to another task with a priority lower than the one task.

In the embodiment, the specifications of the RTOS R allow the program tasks T to be characterized into two kinds of tasks: basic tasks T1 and extended tasks T2.

Each of the basic tasks T1 can stay in the following three different states: a running state, a ready state, and a suspended state. In contrast, each of the extended tasks T2 can stay in the following four states: the running state, the ready state, a waiting state, and the suspended state.

In a task staying in the running state, the CPU 11 is assigned to the task, so its instructions can be executed by the CPU 11.

In a task staying in the ready state, all functional prerequisites for transition into the running state exist, and the task only waits for allocation of the CPU 11.

In a task staying in the waiting state, the task cannot continue execution because it has to wait for at least one event or the like. The extended tasks only can jump into this waiting state.

In a task staying in the suspended state, the task is passive and can be activated.

In the ECU 10, the specification of the RTOS R allow:

assignment of a common stack region allocated in the RAM 13 to some of the basic tasks with the same priority; and assignment of a dedicated stack region allocated in the RAM 13 to each of the individual extended tasks.

For example, 4 kilobytes of space in the RAM 13 are allocated to the common stack region, and 1 kilobyte of space in the RAM 13 is allocated to each of the dedicated stack regions.

Figure 3A:
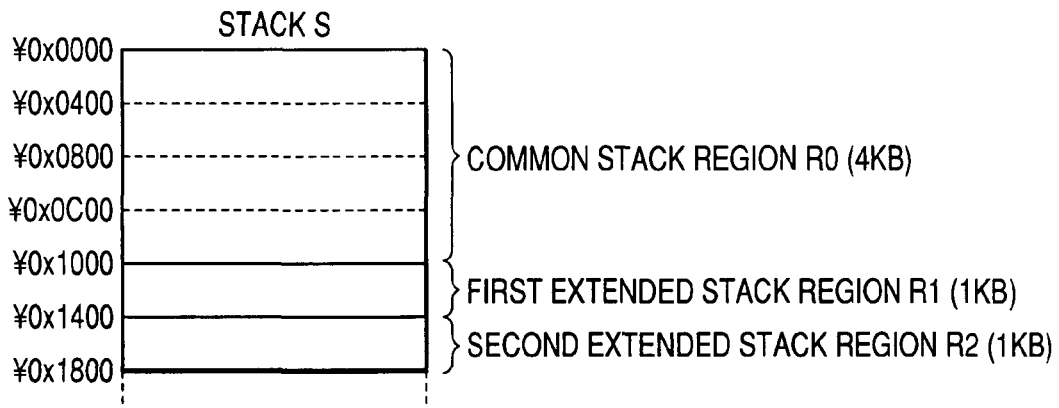
FIG. 3A is a view schematically illustrating an example of the structure of memory locations of the RAM.

As illustrated in FIG. 3A, the common stack region and the plurality of dedicated stack regions are aligned.

The RTOS R includes a stack manager M2 that causes the CPU 11 to save, in a corresponding stack region in the RAM 13, context data identifying the state of a task, such as the state of each register thereof, being used during running of the task upon switching from one task to another task. For example, the context data consists of a plurality of bits.

Information indicative of how to allocate a space in the RAM 13 to the stack regions for the basic tasks T1 and the extended tasks T2 has been stored in a stack table ST allocated in the RAM 13.

The stack table ST has stored therein leading addresses (locations) of the respective stack regions constituting the stack S in the order of, for example, the array of stack regions from the leading address (the origin) of the stack S allocated in the RAM 13.

The stack table ST also has stored therein an end address (location) of the stack S allocated in the RAM 13.

For example, it is assumed that a common stack region R0 of 4 kilobytes for some of the basic tasks with the same priority, a first dedicated stack region R1 of 1 kilobyte for a first extended task, and a second dedicated stack region R2 of 1 kilobyte for a second extended task are sequentially allocated in the RAM 13 from its address of "0x0000" (see FIG. 3A).

Figure 3B:
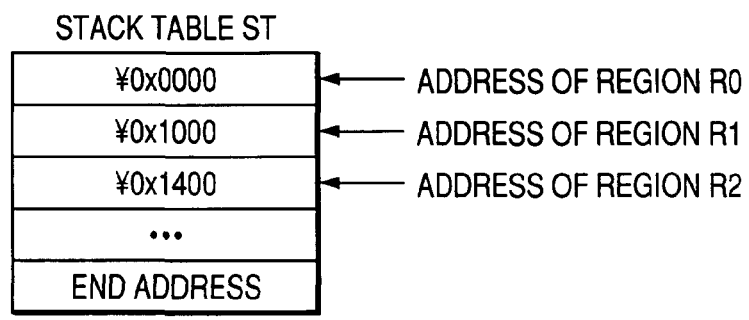
FIG. 3B is a view schematically illustrating an example of the structure of memory locations of a stack table allocated in the RAM.

In this assumption, the stack table ST has stored therein: the leading address of "0x0000" of the common stack region R0, the leading address of "0x1000" of the first dedicated stack region R1, the leading address of "0x1400" of the second dedicated stack region R2, and the end address of the stack S allocated in the RAM 13 (see FIG. 3B).

In addition, the ECU 10 has a function of:

measuring the amount of space to be used in each of the stack regions in the stack S so as to obtain the maximum amount of space to be used in any at least one of the stack regions in the stack S; and store therein the obtained maximum amount of space to be used in any at least one of the stack regions in the stack S.

In other words, the ECU 10 has a stack check function of:

measuring the amount of data stored in each of the stack regions in the stack S so as to obtain the maximum amount of data stored in any at least one of the stack regions in the stack S; and store therein the obtained maximum amount data stored in any at least one of the stack regions in the stack S.

For example, a stack check task CT corresponding to a stack check program C stored in the ROM 15 causes the CPU 11 to implement the stack check function.

As described hereinafter, the stack check task CT is configured to be generated each time the ECU 10 is started as an idle task lower in priority than all of the tasks T.

Specifically, the stack check task CT is configured to:

(a) reference each bit of data to be located in a check target region corresponding to a selected one of the stack regions in the stack S;

(b) measure the maximum amount of data stored in the check target region;

(c) store the measured maximum amount of data in a peak table PT allocated in the RAM 13;

(d) repeat the processes (a) to (c) while sequentially changing a target stack region to another one in all of the stack regions without the stack region corresponding to the idle task.

Figure 4:
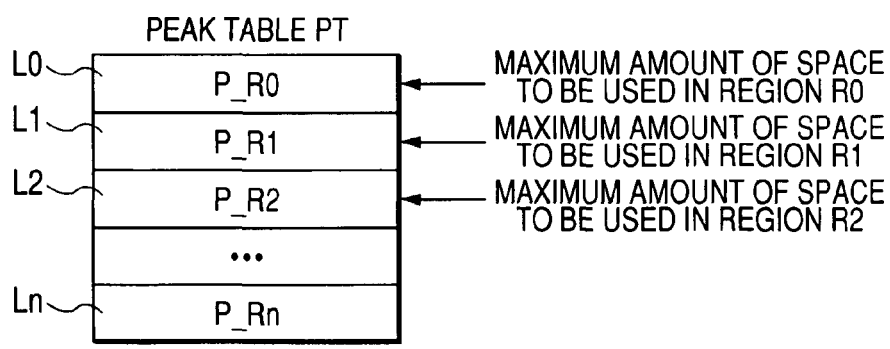
FIG. 4 is a view schematically illustrating an example of the structure of memory locations of a peak table allocated in the RAM.
Figure 5:
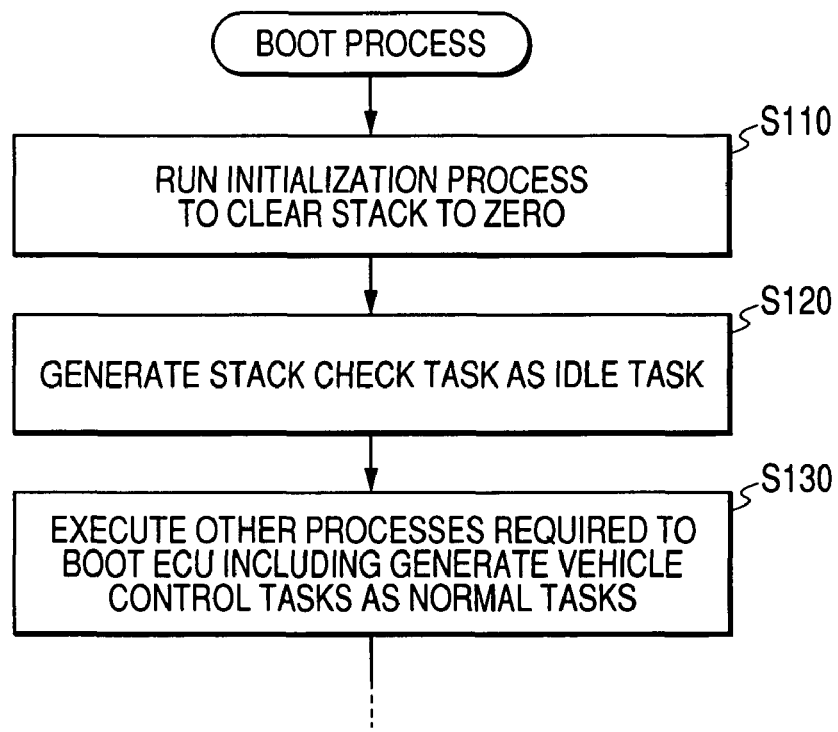
FIG. 5 is a flow chart schematically illustrating an example of a boot process to be executable by a CPU of the ECU according to the embodiment.

FIG. 4 schematically illustrates an example of the structure of memory locations of the peak table PT allocated in the RAM 13.

The peak table PT consists of a plurality of memory locations corresponding to the stack regions constituting the stack S. When the maximum amount of space to be used in a target stack region is measured by the stack check task CT, the measured amount of space to be used in the target stack region is configured to be stored in one of the memory locations of the peak table PT corresponding to the target stack region.

When a value P_R0 indicative of the maximum amount of space to be used in the common stack region R0 as the target stack region is measured by the stack check task CT, the measured value P_R0 is configured to be stored in the memory location L0 corresponding to the common stack region R0 (see FIG. 4).

Similarly, when a value P_R1 indicative of the maximum amount of space to be used in the first dedicated stack region R1 as the target stack region is measured by the stack check task CT, the measured value is configured to be stored in the memory location L1 corresponding to the first dedicated stack region R1. When a value P_R2 indicative of the maximum amount of space to be used in the second dedicated stack region R2 as the target stack region is measured by the stack check task CT, the measured value P_R2 is configured to be stored in the memory location L2 corresponding to the second dedicated stack region R2.

That is, when the a value P_Rn indicative of the maximum amount of space to be used in the n-th dedicated stack region Rn as the target stack region is measured by the stack check task CT, the measured value P_Rn is configured to be stored in the memory location Ln corresponding to the n-th dedicated stack region Rn (see FIG. 4).

The measured values P_R0, P_R1, ..., P_Rn indicative of the respective maximum amounts of space to be used in the individual target stack regions are preferably written into the corresponding memory locations of the peak table PT in block described in detail hereinafter. The smaller the maximum amount of space to be used in a target stack region is, the greater the corresponding measured value P_Rk (k= 0, 1, 2, ..., n−1, or n) is in size.

For this reason, as a default value for each of the values P_R0, P_R1, ..., P_Rn, the maximum value in a range within which a corresponding one of the values P_R0, P_R1, ..., P_Rn can take on has been set to be stored in a corresponding one of the memory locations L0, L1, L2, ..., Ln of the peak table PT. The stack check task CT is configured to update the default values stored in the memory locations L0, L1, ..., Ln of the peak table PT.

For example, a method of how to measure the maximum amount of space to be used in each of the stack regions by the stack check task CT of the CPU 11 will be described hereinafter.

In the ECU 10 according to the embodiment, the stack S allocated in the RAM 13 is zero cleared to be reset when the ECU 10 is started, and thereafter the stack S is not reset. For this reason, in the stack S, even if context data saved in a target stack region in the stack S is returned to the CPU 11 or deleted, historical data indicative of the saved context data remains in the target stack region as a set (logical 1) or a reset (logical 0) of each bit thereof.

Specifically, the stack check task CT works to reference the historical data remaining in a target stack region and to measure the maximum amount of data saved in the target stack region based on the reference result (see step S10 in FIG. 2).

Next, operations of the CPU 11 for generating the stack check task CT and those of the generated stack check task to be executable by the CPU 11 will be described hereinafter with reference to FIGS. 5 to 9.

During startup, the CPU 11 runs a boot program B included in the programs P to execute a boot process.

In the boot process in accordance with the boot program B, the CPU 11 executes initialization processes to clear all memory locations of the RAM 13 including the stack S to zero in step S110.

Next, in the boot process, the CPU 11 generates, as an idle task, a stack check task CT with a predetermined priority based on the stack check program C in step S120.

Subsequently, in the boot process, the CPU 11 executes other processes required to boot the ECU 10 in step S130. For example, the CPU 11 generates, based on the plurality of control programs CP, the plurality of normal tasks T each with a priority higher than the priority of the stack check task (idle task) CT. The plurality of normal tasks T allow the target in-vehicle devices to be controlled.

Note that the plurality of tasks T higher in priority than the stack check task (idle task) CT will be referred to as normal tasks hereinafter.

Figure 6:
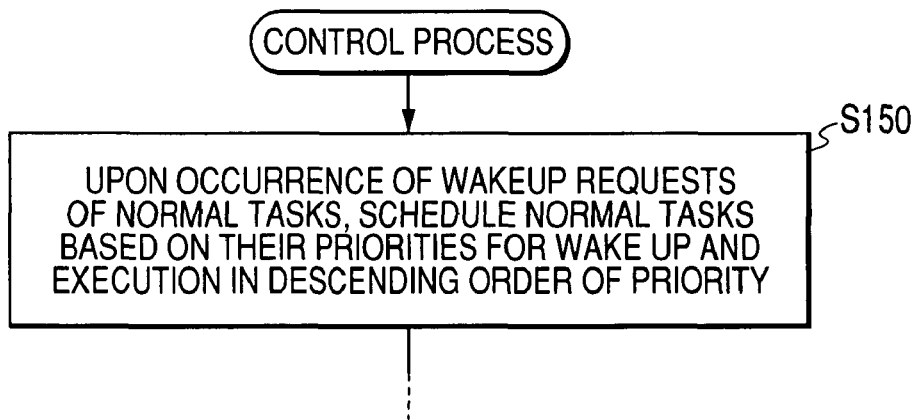
FIG. 6 is a flow chart schematically illustrating an example of a control process to be executable by a CPU of the ECU according to the embodiment.

Thereafter, upon occurrence of wakeup requests of the normal tasks T in response to input of a time-synchronized event or an irregular event to the ECU 10, the task manager M1 of the RTOS R causes the CPU 11 to schedule the normal tasks T based on their priorities for wakeup and execution in descending order of priority in step S150 of FIG. 6.

Figure 7:
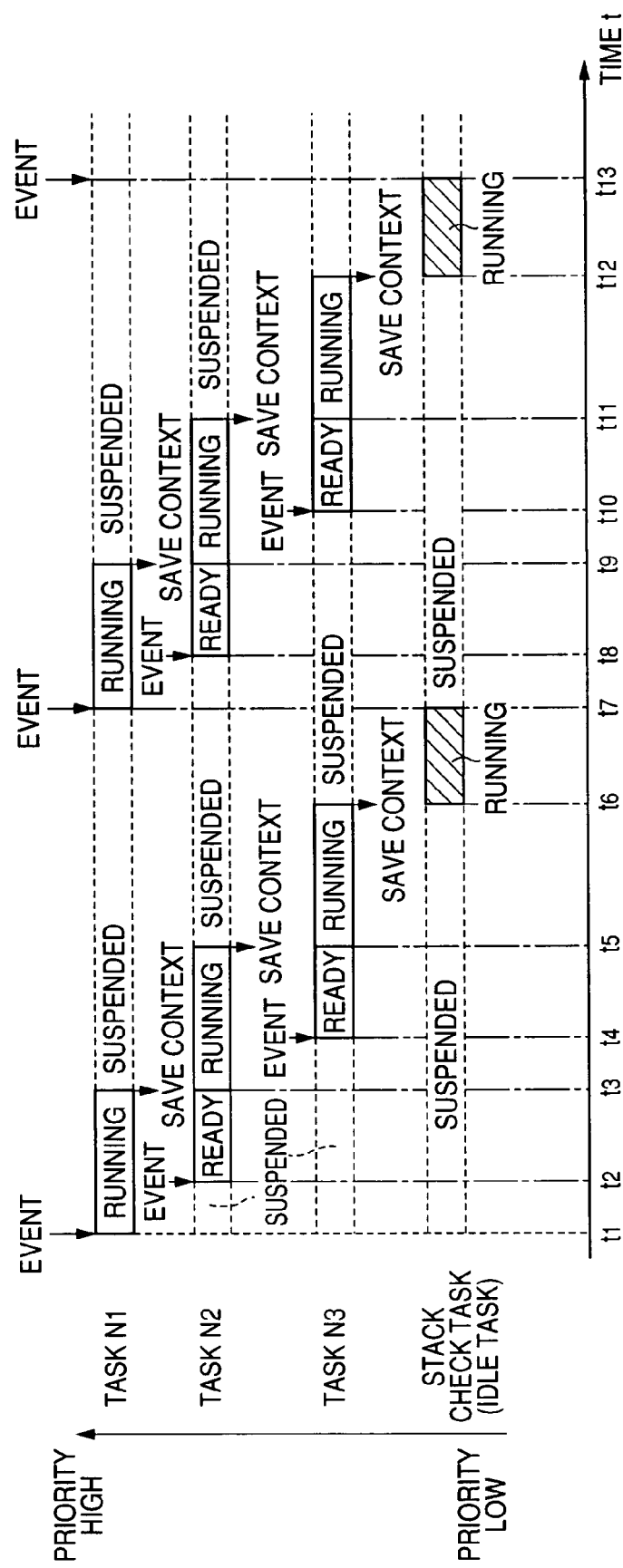
FIG. 7 is a timing chart schematically illustrating operations of the CPU under the RTOS illustrated in FIG. 1.

For example, as illustrated in FIG. 7, a first normal task N1, a second normal task N2, and a third normal task N3 are arranged to be in descending order of priority.

Specifically, in FIG. 7, when a wakeup request of the task N1 is generated in response to input of a corresponding event to the ECU 10 at time t1, the RTOS R causes the CPU 11 to schedule the task N1 so as to run it at time t1.

Before completion of execution of the task N1, a wakeup request of the task N2 is generated in response to input of a corresponding event to the ECU 10 at time t2. Because the priority of the task N2 is lower than the task N1, the RTOS R causes the CPU 11 to switch the task N2 from the suspended state to the ready state at time t2.

After completion of execution of the task N1 at time t3, the RTOS R causes the CPU 11 to:

save context data identifying the state of each register during running of the task N1 in a corresponding one of the stack regions in the stack S;

shift the task N1 to the suspended state; and shift the task N2 from the ready state to the running state, thus executing the task N2.

Before completion of execution of the task N2, a wakeup request of the task N3 is generated in response to input of a corresponding event to the ECU 10 at time t4. Because the priority of the task N3 is lower than the task N2, the RTOS R switches the task N3 from the suspended state to the ready state at time t4.

After completion of execution of the task N2 at time t5, the RTOS R causes the CPU 11 to:

save context data identifying the state of each register during running of the task N2 in a corresponding one of the stack regions in the stack S;

shift the task N2 to the suspended state; and shift the task N3 from the ready state to the running state to thereby execute the task N3.

After completion of execution of the task N3 at time t6, because no normal tasks stay in both the running state and the ready state, the RTOS R causes the CPU 11 to:

save context data identifying the state of each register during running of the task N3 in a corresponding one of the stack regions in the stack S;

shift the task N3 to the suspended state; and shift the stack check task CT from the suspended state to the running state to thereby execute the stack check task CT at time t6.

When a wakeup request of the task N1 is generated in response to input of a corresponding event to the ECU 10 at time t7, the RTOS R causes the CPU 11 to:

switch the stack check task CT to the suspended state;

return the saved context data from the corresponding one stack region so as to set it to each register; and schedule the task N1 so as to run it at time t7.

Before completion of execution of the task N1, a wakeup request of the task N2 is generated in response to input of a corresponding event to the ECU 10 at time t8. Because the priority of the task N2 is lower than the task N1, the RTOS R causes the CPU 11 to switch the task N2 from the suspended state to the ready state at time t8.

After completion of execution of the task N1 at time t9, the RTOS R causes the CPU 11 to:

save the context data identifying the state of each register during running of the task N1 in the corresponding one of the stack regions in the stack S;

shift the task N1 to the suspended state;

return the saved context data from the corresponding one stack region so as to set it to each register; and shift the task N2 from the ready state to the running state, thus executing the task N2.

Before completion of execution of the task N2, a wakeup request of the task N3 is generated in response to input of a corresponding event to the ECU 10 at time t10. Because the priority of the task N3 is lower than the task N2, the RTOS R causes the CPU 11 to switch the task N3 from the suspended state to the ready state at time t10.

After completion of execution of the task N2 at time t11, the RTOS R causes the CPU 11 to:

save the context data identifying the state of each register during the running of the task N2 in the corresponding one of the stack regions in the stack S;

shift the task N2 to the suspended state;

return the saved context data from the corresponding one stack region so as to set it to each register; and shift the task N3 from the ready state to the running state, thus executing the task N3.

After completion of execution of the task N3 at time t12, because no normal tasks stay in both the running state and the ready state, the RTOS R causes the CPU 11 to:

save the context data identifying the state of each register during the running of the task N3 in the corresponding one of the stack regions in the stack S;

shift the task N3 to the suspended state;

return the saved context data from the corresponding one stack region so as to set it to each register; and shift the stack check task CT from the suspended state to the running state to thereby execute the stack check task CT at time t12.

When a wakeup request of the task N1 is generated in response to input of a corresponding event to the ECU 10 at time t13, the RTOS R causes the CPU 11 to switch the stack check task CT to the suspended state.

Specifically, as illustrated in FIG. 7, during no normal tasks being kept in either the running state or the ready state, that is, during the time intervals between t6 and t7 and between t12 and t13, the stack check task CT can be executed by the CPU 11.

Next, a stack check process to be executable by the CPU 11 in accordance with the stack check task CT will be described hereinafter with reference to FIG. 8.

When launching the stack check task CT, the CPU 11 references the stack table ST and select one of the stack regions allocated in the RAM 13 as a check target region based on the reference result in step S210.

Next, the CPU 11 resets a count value "Count" of a counter to zero (0) in step S220. As the counter, one of internal registers 11a of the CPU 11 or a software counter created by the CPU 11 can be used.

Thereafter, the CPU 11 references the stack table ST to retrieve the leading address of the check target region, thus setting a check target address Adr to the retrieved leading address of the check target in step S230.

Next, the CPU 11 references one block of addresses from the check target address in the check target region in step S240, and determines whether all bits of pieces of data stored in the referenced block are 0 in step S250. The determination in step S250 allows the CPU 11 to determine whether data has been written in the block.

In the embodiment, addresses of M bytes can be set to the size of one block; this M is a positive integer equal to or greater than 1. For example, addresses of 4 bytes has been set to the size of the referenced block.

Specifically, in step S250, the CPU 11 determines whether all bits of pieces of data stored in the referenced block are 0.

When it is determined that all bits of pieces of data stored in the referenced block are 0 (the determination in step S250 is YES), the CPU 11 updates the check target address Adr to the top address of the next block in step S260. Specifically, in step S260, the CPU 11 adds the length Blk of one block in the longitudinal direction of the stack S to the check target address Adr to thereby update the check target address Adr to the top address of the next one block located adjacently below the current referenced block. Thereafter, the CPU 11 proceeds to step S270.

In step S270, the CPU 11 increments the count value Count by 1. This allows the count value of the counter to represent the number of blocks in which no pieces of data have been written.

Next, in step S280, the CPU 11 determines whether the count value Count exceeds a predetermined upper limit.

When it is determined that the count value Count exceeds the predetermined upper limit (the determination in step S280 is YES), the CPU 11 shifts to step S320.

Otherwise, when it is determined that the count value Count is equal to or lower than the predetermined upper limit (the determination in step S280 is NO), the CPU 11 shifts to step S240. In step S240, the CPU 11 references one block of addresses from the updated check target address in the check target in step S240, and determines whether all bits of pieces of data stored in the referenced block are 0 in step S250.

Figure 9A:
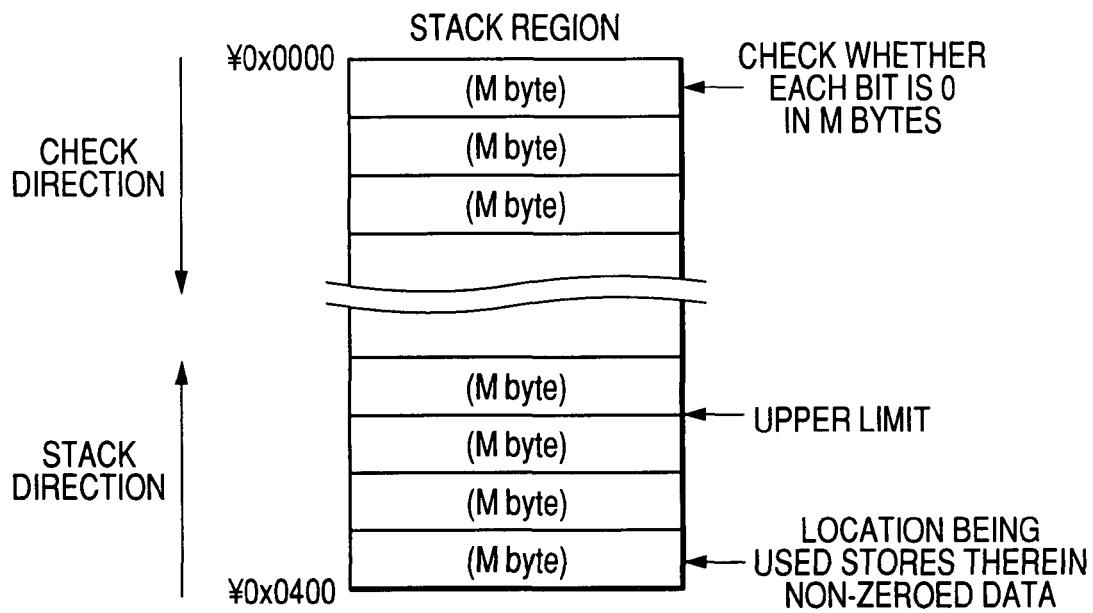
FIG. 9A is a view schematically illustrating an example of how to measure the amount of space to be used in a stack according to the embodiment.

Specifically, the operations in steps S240 to S280 allow the CPU 11 to check whether all bits of pieces of data stored in the check target region are 0 block by block from the top address thereof (see FIG. 9A).

Note that the upper limit can be set to the size of a check target region and to a constant value independently of the size of a check target region. The upper limit also can be determined by one or more software developers during the design phase of the stack check program C.

Preferably, the upper limit can be set to be equal to or lower than the difference calculated by subtracting 1 from the number of blocks in a check target region. This is because, if the upper limit is set to be greater than the difference calculated by subtracting 1 from the number of blocks in a check target region, an overflow block beyond the leading address of a check target region would be checked. Thus, set of the upper limit to the difference calculated by subtracting 1 from the number of blocks in a check target region can prevent an overflow block from being checked.

More preferably, the upper limit can be set to be lower than the difference calculated by subtracting 1 from the number of blocks in a check target region.

Specifically, into the lower portion of a check target region, context data is normally written during execution of the normal tasks. Thus, even if a count value Count corresponding to the lower portion of the check target region is stored in the peak table PT, the count value stored in the peak table PT cannot useful to avoid software failure. Moreover, if all of the blocks in each of the stack regions are checked, a certain amount of time is taken.

However, set of the upper limit to be lower than the difference calculated by subtracting 1 from the number of blocks in a check target region allows the problems set forth above from being avoided.

Otherwise, when it is determined that all bits of pieces of data stored in the referenced block are not 0 (the determination in step S250 is NO), the CPU 11 determines that the current count value Count corresponds to the peak address of locations to be used in the check target region. Then, the CPU 11 proceeds to step S290.

In step S290, the CPU 11 reads out, from the peak table PT, a value P_Rk indicative of the maximum amount of space to be used in the check target region (the peak address of space to be used in the check target region) previously obtained or initially determined.

Next, the CPU 11 determines whether the current count value Count is lower than the readout value P_Rk in step S300.

Figure 9B:
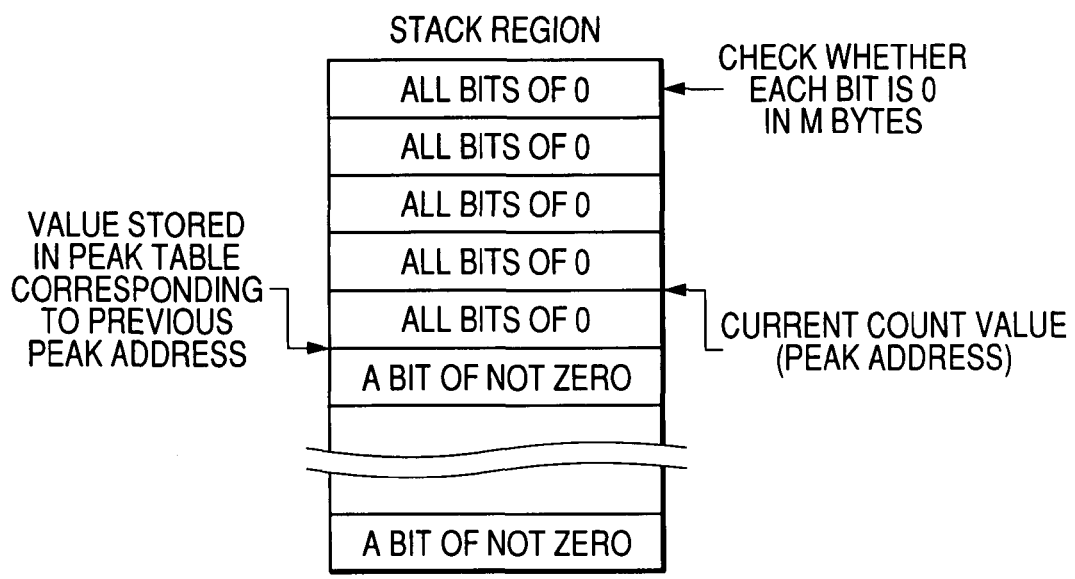
FIG. 9B is a view schematically illustrating an example of how to execution determination of step S300 illustrated in FIG. 8.

When it is determined that the current count value Count is lower than the readout value P_Rk (the determination in step S300 is YES), the CPU 11 determines that the maximum amount of space to be used in the check target region is increased, proceeding to step S310 (see FIG. 9B).

In step S310, the CPU 11 updates the value P_Rk representing the maximum amount of space to be used in the check target region to the current count value Count (P←Count), proceeding to step S320.

Otherwise, when it is determined that the current count value Count is equal to or greater than the readout value P_Rk (the determination in step S300 is NO), the CPU 11 proceeds to step S320 while skipping the operation in step S310.

In step S320, the CPU 11 determines whether all of the stack regions that should be set as check target regions in the stack S are subjected to the sequential check operations in steps S220 to S310.

When it is determined that all of the stack regions in the stack S that should be set as check target regions in the stack S are not subjected to the sequential check operations in steps S220 to S310 (the determination in step S320 is NO), the CPU 11 proceeds to step S330.

In step S330, the CPU 11 references the stack table ST and select another one of the unchecked stack regions allocated in the RAM 13 as a check target region based on the reference result in step S330, shifting to the operation in step S220. Thereafter, the CPU 11 repeatedly carries out the operations in steps S220 to S330 until the determination in step S320 is affirmative.

When it is determined that all of the stack regions that should be set as check target regions in the stack S are subjected to the sequential check operations in steps S220 to S310 (the determination in step S320 is YES), the CPU 11 proceeds to step S340.

In step S340, the CPU 11 clears the stack S to zero, shifting to step S210. Then, the CPU 11 repeatedly executes the sequential operations in steps S210 to S340.

Figure 8:
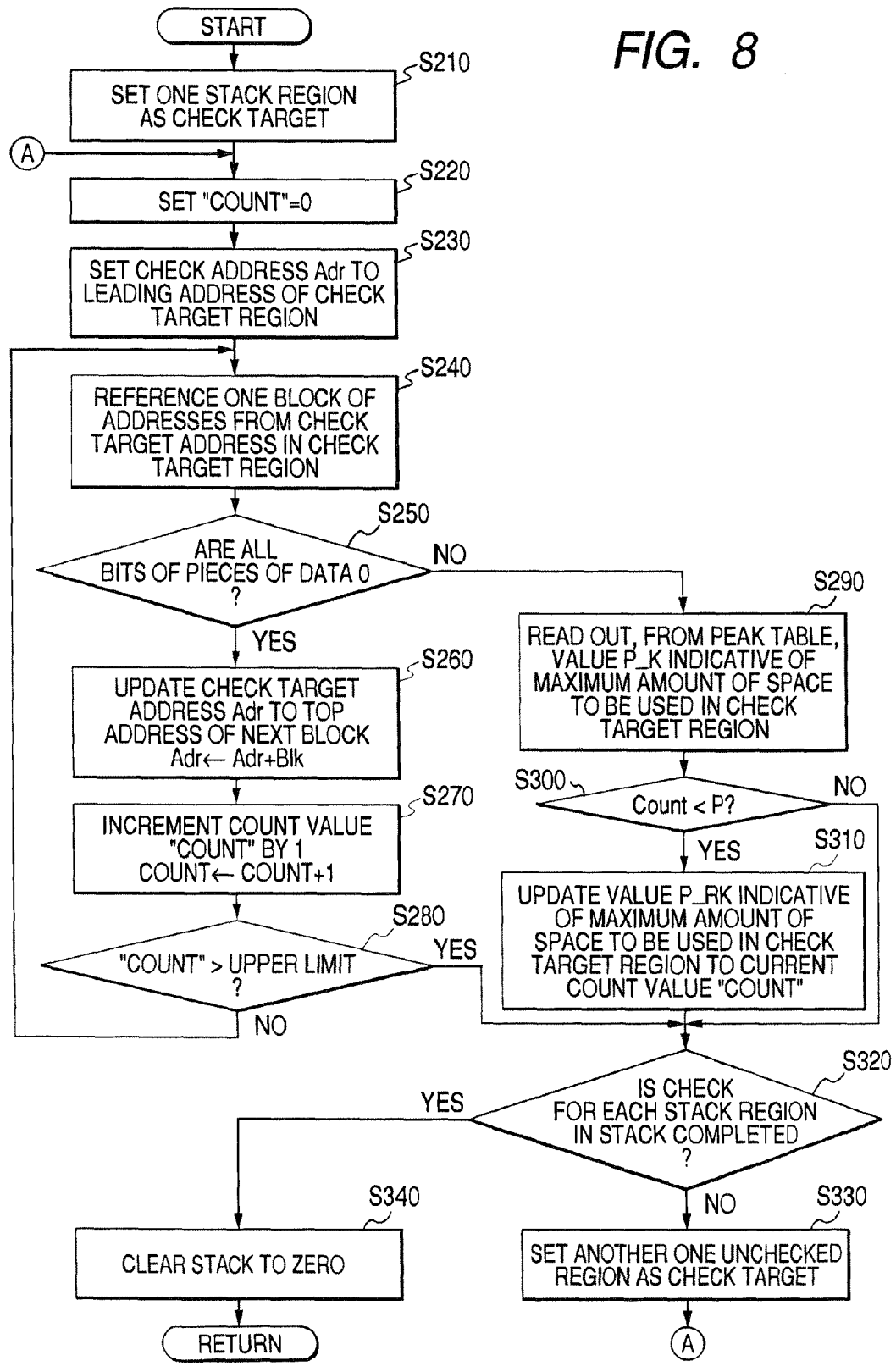
FIG. 8 is a flow chart schematically illustrating an example of a stack check process to be executable by the CPU according to the embodiment.

As described above and illustrated in FIG. 7, the CPU 11 repeatedly executes the stack check process illustrated in FIG. 8 while the CPU 11 is in the idle state, in other words, while all other normal tasks stay in neither the running state nor the ready state.

Thus, upon the occurrence of a wakeup request and/or an interrupt associated with, for example, one of the normal tasks, the CPU 11 interrupts the stack check process to handle the wakeup request (interrupt) in priority to the stack check process.

As set force above, the ECU 10 according to the embodiment is configured to generate the stack check task CT as an idle task; this stack check task CT causes the CPU 11 to:

measure the maximum amount of data stored in a check target region corresponding to selected one of the stack regions in the stack S; and store the measured maximum amount of data in the check target region in the peak table PT allocated in the RAM 13.

The task manager M1 of the ECU 10 causes the CPU 11 to wake up the stack check task CT while no normal tasks T stay in either the running state or the ready state.

Specifically, in the embodiment, the stack check task CT is placed to an additional task included with the normal tasks T required to control the target in-vehicle devices. This allows the normal tasks T to be carried out in priority to the stack check task CT. Thus, in the embodiment, it is possible to increase the operation rate of the CPU 11 for execution of the normal tasks. In other words, it is possible to measure the maximum amount of data stored in each of the stack regions in the stack S thereby to store the measured maximum amount of data in each of the stack regions in the peak table PT while keeping high the CPU's operation rate.

As described above, in the Patent Publication No. 2000-187601, an amount of space in a stack being used to execute a task is detected based on the monitor of movement of a stack pointer.

In contrast, in the embodiment, the maximum amount of space to be used in each of the stack regions in the stack S can be detected based on the historical data remaining in each of the stack regions therein. Even if other tasks stay in neither the running state nor the ready state, therefore, it is possible to properly measure the maximum amount of space to be used in each of the stack regions in the stack S.

In addition, the ECU 10 is configured to sequentially reference, block by block, each of the stack regions from its top address toward its bottom address in a direction opposing to the data stack direction to thereby check whether all bits of pieces of data stored in each of the referenced blocks are 0.

At this point, it is assumed that check of a stack region from its bottom address toward its top address.

In this assumption, because pieces of data stored in the lower portion of the stack region may consist of the sequence of 0 bits (reset bits), even if all bits of pieces of data are 0 in a referenced block, the referenced block does not necessarily correspond to a location at which the maximum amount of space is used.

For this reason, in this assumption, if the check is completed at the location so that the current count value Count is determined as the peak address corresponding to the maximum amount of space, the CPU 11 may erroneously understand the maximum amount of space to be used in the check target region in the stack S.

In order to avoid the misunderstanding, it is necessary to check all blocks of each of the stack regions and/or sufficiently increase the size of one block used for checking.

However, in the embodiment, the ECU 10 is configured to sequentially reference, block by block, each of the stack regions from its top address toward its bottom address in a direction opposing to the data stack direction to thereby check whether all bits of pieces of data stored in each of the referenced blocks are 0.

Specifically, the stack S is configured to stack pieces of data from the predetermined bottom location corresponding to the end address thereof upward (see FIG. 9A). For this reason, check of the stack S from its top location, in which pieces of data are lastly stored, to its bottom location can avoid the misunderstanding. This makes it possible to properly and rapidly measure the maximum amount of space to be used in each of the stack regions in the stack S.

Moreover, in the embodiment, the ECU 10 is configured to sequentially check, block by block, each of the stack regions from its top address up to a predetermined address corresponding to the predetermined upper limit, thus omitting the check of the remaining blocks between the predetermined address and the end address in each of the stack regions (see FIG. 9A). This is because data of the remaining blocks would not be required to avoid overflow of the stack S.

Accordingly, in the present embodiment, it is possible to rapidly and effectively store information required to analyze software modules, such as the control programs CP.

In the embodiment and its modifications, those skilled in the art will appreciate that the present invention is capable of being distributed as program products, for example, the programs P including the control programs CP in the ROM 15 in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

In the embodiment and its modifications, the present invention is applied to an electronic control unit operative to control one or more target in-vehicle devices, but the present invention is not limited to the structure.

Specifically, the present invention can be applied to an electronic unit installed with a processor and a memory to which the processor is accessible; this memory contains a stack allocated therein.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. An electronic unit equipped with a microprocessor and a random access memory, in which the microprocessor performs, based on a multitask operating system able to run a plurality of tasks, a task in the plurality of tasks, and save context data of the task in a stack provided in the random access memory, the context data being composed of a plurality of bits, and, if the context data is returned to the microprocessor or deleted, a value of each bit of the context data saved in the stack remains in the stack as historical data, the electronic unit comprising:
a measuring module configured to:
reference, block by block, the stack to detect a block with all bits being reset as a target block without the historical data, and
measure a maximum amount of data stored in the stack based on a number of the target blocks in the stack, the target blocks continuing from a top of the stack toward a bottom thereof in a direction opposing to data stack direction in the stack;
a storing module configured to store therein the maximum amount of data measured by the measuring unit; and
an activation control module configured to activate the measuring unit during a task using the stack in neither a running state nor a ready state.

2. The electronic unit according to claim 1, wherein the measuring module is configured to reference an inside of the stack from the top of the stack toward the bottom thereof in the direction opposing to the data stack direction, and measure the maximum amount of data stored in the stack based on the number of the target blocks in the stack.

3. The electronic unit according to claim 2, wherein the measuring module is configured to reference the inside of the stack from the top of the stack to a preset location above the bottom thereof in the direction opposing to the data stack direction, and measure the maximum amount of data stored in the stack based on the number of the target blocks in the stack.

4. The electronic unit according to claim 2, wherein the measuring module is configured to reference an inside of the stack from the top of the stack toward the bottom thereof in the direction opposing to the data stack direction, and measure the maximum amount of data stored in the stack based on the number of the target blocks in the stack.

5. The electronic unit according to claim 4, wherein the measuring module is configured to reference the inside of the stack from the top of the stack to a preset location above the bottom thereof in the direction opposing to the data stack direction, and measure the maximum amount of data stored in the stack based on the number of the target blocks in the stack.

6. An electronic unit equipped with a microprocessor and a random access memory, in which the microprocessor performs, based on a multitask operating system able to run a plurality of tasks, a task in the plurality of tasks, and save context data of the task in a stack provided in the random access memory, the context data being composed of a plurality of bits, and, if the context data is returned to the microprocessor or deleted, a value of each bit of the context data saved in the stack remains in the stack as historical data, each of the plurality of tasks having a priority, the electronic unit comprising:
a measuring module configured to:
reference, block by block, the stack to detect a block with all bits being reset as a target block without the historical data, and
measure a maximum amount of data stored in the stack based on a number of the target blocks in the stack, the target blocks continuing from a top of the stack to a bottom thereof in a direction opposing to data stack direction; and
a storing module configured to store therein the maximum amount of data measured by the measuring unit.

* * * * *